US010866948B2

(12) United States Patent
Yoon

(10) Patent No.: US 10,866,948 B2
(45) Date of Patent: Dec. 15, 2020

(54) ADDRESS BOOK MANAGEMENT APPARATUS USING SPEECH RECOGNITION, VEHICLE, SYSTEM AND METHOD THEREOF

(71) Applicants: Hyundai Motor Company, Seoul (KR); Kia Motors Corporation, Seoul (KR)

(72) Inventor: Hyunjin Yoon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 5 days.

(21) Appl. No.: 15/802,122

(22) Filed: Nov. 2, 2017

(65) Prior Publication Data
US 2018/0357269 A1    Dec. 13, 2018

(30) Foreign Application Priority Data

Jun. 9, 2017   (KR) .......................... 10-2017-0072236

(51) Int. Cl.
*G06F 16/23*      (2019.01)
*G10L 15/16*     (2006.01)
(Continued)

(52) U.S. Cl.
CPC .......... *G06F 16/2379* (2019.01); *G06F 3/167* (2013.01); *G06N 3/08* (2013.01);
(Continued)

(58) Field of Classification Search
CPC ....... G06F 16/2379; G06F 3/167; G06N 3/08; G10L 15/16; G10L 15/22; G10L 15/30; G10L 2015/088; H04L 61/1594
See application file for complete search history.

(56) References Cited

U.S. PATENT DOCUMENTS 6,104,989 A *  8/2000  Kanevsky ............. G06F 40/216
                                               704/9
10,521,514 B2 * 12/2019  Lee ......................... G10L 25/51
(Continued)

FOREIGN PATENT DOCUMENTS

KR         100640813 B1    11/2006
KR       1020080051953 A    6/2008
(Continued)

*Primary Examiner* — Fariba Sirjani
(74) *Attorney, Agent, or Firm* — Slater Matsil, LLP

(57) ABSTRACT

Disclosed are an address book management apparatus using speech recognition, a vehicle, an address book management system and an address book management method using the speech recognition. The address book management method may include connecting a first terminal device storing an address book database to a second terminal device storing an address book database to communicate with each other; obtaining a speech signal of at least one of a first user of the first terminal device and a second user of the second terminal device, from the first terminal device; performing speech recognition on at least one speech signal of the first user and the second user; obtaining a first keyword from the at least one speech signal of the first user and the second user, based on a result of the speech recognition; and updating the address book database using the first keyword.

20 Claims, 12 Drawing Sheets

US 10,866,948 B2
Page 2

(51) Int. Cl.
*G10L 15/22* (2006.01)
*H04L 29/12* (2006.01)
*G06N 3/08* (2006.01)
*G10L 15/30* (2013.01)
*G06F 3/16* (2006.01)
*G10L 15/08* (2006.01)
*G06N 3/04* (2006.01)

(52) U.S. Cl.
CPC .............. *G10L 15/16* (2013.01); *G10L 15/22* (2013.01); *G10L 15/30* (2013.01); *H04L 61/1594* (2013.01); *G06N 3/04* (2013.01); *G10L 2015/088* (2013.01)

(56) References Cited

U.S. PATENT DOCUMENTS

| | | | |
|---|---|---|---|
| 10,559,304 B2* | 2/2020 | Lee | G10L 15/22 |
| 2003/0158860 A1* | 8/2003 | Caughey | G06Q 10/107 |
| 2006/0047639 A1* | 3/2006 | King | H04N 1/00244 |
| 2007/0033217 A1* | 2/2007 | Basner | G06Q 10/10 |
| 2007/0061420 A1* | 3/2007 | Basner | G06Q 10/10 |
| | | | 709/217 |
| 2009/0171979 A1* | 7/2009 | Lubarski | G06Q 10/10 |
| 2010/0030755 A1* | 2/2010 | Kim | G06K 9/00288 |
| | | | 707/726 |
| 2010/0306185 A1* | 12/2010 | Smith | G06F 16/275 |
| | | | 707/709 |
| 2010/0330993 A1* | 12/2010 | Kone | H04W 36/0055 |
| | | | 455/436 |
| 2011/0082896 A1* | 4/2011 | Kumar | H04M 7/0024 |
| | | | 709/202 |
| 2011/0141974 A1* | 6/2011 | Lieberman | H04L 51/38 |
| | | | 370/328 |
| 2012/0158751 A1* | 6/2012 | Tseng | G06F 16/9535 |
| | | | 707/751 |
| 2012/0254132 A1* | 10/2012 | Kivirauma | G06F 16/24556 |
| | | | 707/692 |
| 2012/0330993 A1* | 12/2012 | Faiman | G06Q 10/107 |
| | | | 707/769 |
| 2013/0019176 A1* | 1/2013 | Miyashita | G06F 16/685 |
| | | | 715/728 |
| 2013/0110907 A1* | 5/2013 | Sherwin | G06Q 10/00 |
| | | | 709/203 |
| 2015/0310862 A1* | 10/2015 | Dauphin | G10L 15/1815 |
| | | | 704/257 |
| 2015/0317977 A1* | 11/2015 | Manjunath | G10L 17/00 |
| | | | 704/270 |
| 2018/0309866 A1* | 10/2018 | Devaraj | H04M 1/72547 |
| 2018/0332118 A1* | 11/2018 | Phipps | H04L 67/125 |

FOREIGN PATENT DOCUMENTS

| | | |
|---|---|---|
| KR | 1020090032053 A | 3/2009 |
| KR | 1020110096329 A | 8/2011 |

* cited by examiner

FIG. 2

| | NAME | ORGANIZATION | JOB POSITION / TITLE | RELATIONSHIP | CONTACT |
|---|---|---|---|---|---|
| | a1 | a2 | a3 | a4 | a5 |
| 161 | A | • | • | CHILD | 010-xxxx-xxxx |
| 163 | B | E COMPANY | PRESEDENT | • | 010-xxxx-xxxx |
| 165 | C | • | MANAGER | • | xxx@mail.com |
| 167 | D | • | • | WIFE | 02-xxxx-xxxx |

FIG. 3B

| FIELD NAME | FIELD VALUE | EXPECTED VALUE | |
|---|---|---|---|
| NAME | G | 0.92 | ~A1 |
| ORGANIZATION | H COMPANY | 0.83 | ~A2 |
| JOB POSITION / TITLE | MANAGER | 0.91 | ~A3 |
| RELATIONSHIP | PREVIOUSLY | 0.21 | ~A4 |
| IDENTIFICATION NUMBER | 010-xxx-△△△ | N/A | |

ADDRESS BOOK MANAGEMENT APPARATUS USING SPEECH RECOGNITION, VEHICLE, SYSTEM AND METHOD THEREOF

CROSS-REFERENCE TO RELATED APPLICATIONS

This application claims priority to Korean Patent Application No. 10-2017-0072236, filed on Jun. 9, 2017 in the Korean Intellectual Property Office, which application is hereby incorporated herein by reference.

TECHNICAL FIELD

Embodiments of the present disclosure relate to an address book management apparatus using speech recognition, a vehicle, an address book management system and an address book management method using the speech recognition.

BACKGROUND

A vehicle refers to a device that can move while driving on road or track. The vehicle may include three-wheeled or four-wheeled vehicle, a two-wheeled vehicle such as a motorcycle, construction equipment, a cycle, a train traveling on the rails disposed on the line or a vehicle suspended over the air such as a plane or a drone (e.g., a flying car).

In recent, the vehicle may be paired with a terminal device, e.g., a smart phone, and perform all or some of the function of the smart phone by using a display device for the vehicle installed in the vehicle wherein the display device includes a navigation device or a head unit. For example, when the smart phone receives a call, the navigation device may output a sound notification corresponding to the call or a voice of the other party that is received by the smart phone. In addition, the navigation device may receive a voice of the driver and transmit the received voice to a counter terminal device via the smart phone. Accordingly, the driver or passenger of the vehicle may call with the other party without operating the smart phone, and thus the driving stability of the vehicle may be improved.

SUMMARY

Embodiments of the present disclosure provide an address book management apparatus capable of conveniently and easily modifying and updating an address book based on spoken dialogue by using speech recognition, a vehicle, an address book management system, and an address book management method using the speech recognition.

Additional aspects of the present disclosure will be set forth in part in the description which follows and, in part, will be obvious from the description, or may be learned by practice of the present disclosure.

An address book management method using speech recognition, may comprise connecting a first terminal device storing an address book database to a second terminal device storing an address book database to communicate with each other. A speech signal of at least one of a first user of the first terminal device and a second user of the second terminal device is obtained from the first terminal device. Speech recognition is performed on at least one speech signal of the first user and the second user. A first keyword is obtained from the at least one speech signal of the first user and the second user, based on a result of the speech recognition. The address book database is updated using the first keyword.

The update of the address book database using the first keyword may comprises determining a second keyword corresponding to the first keyword, and updating the address book database by adding the second keyword to an object corresponding to the address book database.

The determination of the second keyword corresponding to the first keyword may comprise at least one of determining the second keyword as the same as the first keyword; determining the second keyword by adding a predetermined symbol to the first keyword; and determining the second keyword using a part of the first keyword.

The second keyword corresponding to the first keyword may comprise information related to a relationship between the first user and the second user.

The address book management method may further comprise obtaining identification information of at least one of the second terminal device and the second user.

The update of the address book database using the first keyword may comprise calculating an expected value about the second keyword.

The update of the address book database using the first keyword may comprise at least one of updating the address book database using the second keyword when the expected value is greater than a first reference value, temporarily storing the second keyword when the expected value is in a range of from the first reference value to a second reference value that is relatively smaller than the first reference value, and discarding the second keyword when the expected value is less than the second reference value.

The obtainment of a first keyword from at least one speech signal of the first user and the second user, based on a result of the speech recognition, may comprise analyzing an utterance obtained according to the result of the speech recognition, using the learning algorithm. The learning algorithm comprises at least one of Deep Neural Network (DNN), Convolutional Neural Network (CNN), Recurrent Neural Network (RNN), Deep Belief Network, (DBN), and Deep Q-Networks.

The expected value may comprise a probability output value obtained by the performance of the learning algorithm.

An address book management apparatus using speech recognition, may comprise an address book database, a speech signal input configured to receive an input of a speech signal of a first user, a communicator configured to receive the speech signal of a second user transmitted from a terminal device, and a processor configured to perform speech recognition about at least one speech signal of the first user and the second user, configured to obtain a first keyword from the at least one speech signal of the first user and the second user, based on a result of the speech recognition, and configured to update the address book database using the address book management keyword.

The processor may determine a second keyword corresponding to the first keyword and update the address book database by adding the second keyword to an object corresponding to the address book database.

The processor may determine the second keyword as the same as the first keyword, determine the second keyword by adding a predetermined symbol to the first keyword, or determine the second keyword using a part of the first keyword.

The second keyword corresponding to the first keyword may comprise information related to a relationship between the first user and the second user.

The processor may obtain identification information of at least one of the second terminal device and the second user.

The processor may calculate an expected value about the first keyword.

The processor may update the address book database using the first keyword when the expected value is greater than a first reference value, temporarily store the first keyword when the expected value is in a range of from the first reference value to a second reference value that is relatively smaller than the first reference value, and discard the first keyword when the expected value is less than the second reference value.

The processor may obtain the first keyword by analyzing an utterance obtained according to the result of the speech recognition by using the learning algorithm, wherein the learning algorithm may comprise at least one of Deep Neural Network (DNN), Convolutional Neural Network (CNN), Recurrent Neural Network (RNN), Deep Belief Network, (DBN), and Deep Q-Networks.

The expected value may comprise a probability output value obtained by the performance of the learning algorithm.

A vehicle may comprise a speech signal input configured to receive an input of a speech signal of a first user. A communicator is connected. The communicator is configured to a first terminal device to communicate with the first terminal device, and to transmit the speech signal of the first user to the first terminal device or to receive the speech signal of a second user transmitted from the first terminal device. A vehicle address book database is configured to be periodically synchronized with an address book database stored in the first terminal device, or configured to be synchronized with an address book database stored in the first terminal device, at a certain point of time. A processor is configured to perform speech recognition about at least one speech signal of the first user and the second user, to obtain a first keyword from the at least one speech signal of the first user and the second user, based on a result of the speech recognition, and to update the address book database using the address book management keyword.

The processor may determine a second keyword corresponding to the first keyword and update the address book database by adding the second keyword to an object corresponding to the address book database.

The processor may determine the second keyword as the same as the first keyword, determine the second keyword by adding a predetermined symbol to the first keyword, or determine the second keyword using a part of the first keyword.

The second keyword corresponding to the first keyword may comprise information related to a relationship between the first user and the second user.

The processor may calculate an expected value about the first keyword, updates the address book database with respect to the expected value, stores temporarily the first keyword, or discards the first keyword.

An address book management system using speech recognition, may comprise a first terminal device provided with a first address book database and configured to receive a speech signal of a first user; a second terminal device provided with a second address book database, configured to receive a speech signal of a first user and configured to be connected to the first terminal device to communicate with the first terminal device; and a computing device configured to obtain at least one speech signal of the first terminal device and speech signal of the second terminal device, configured to perform speech recognition about the at least one the speech signal of the first user and the second user, configured to obtain a first keyword from the at least one speech signal of the first user and the second user, based on a result of the speech recognition, and configured to update at least one of the first address book database and the second address book database using the address book management keyword.

BRIEF DESCRIPTION OF THE DRAWINGS

These and/or other aspects of the disclosure will become apparent and more readily appreciated from the following description of embodiments, taken in conjunction with the accompanying drawings of which:

FIG. 2 is a view illustrating an embodiment of an address book database.

FIG. 3B is a table illustrating an expected value about the obtained first keyword.

DETAILED DESCRIPTION OF ILLUSTRATIVE EMBODIMENTS

Reference will now be made in detail to embodiments of the present disclosure, examples of which are illustrated in the accompanying drawings.

An embodiment of address book management apparatus and an address book management system including at least one of address book management apparatus will be described with reference to FIGS. 1 to 8.

Figure 1:
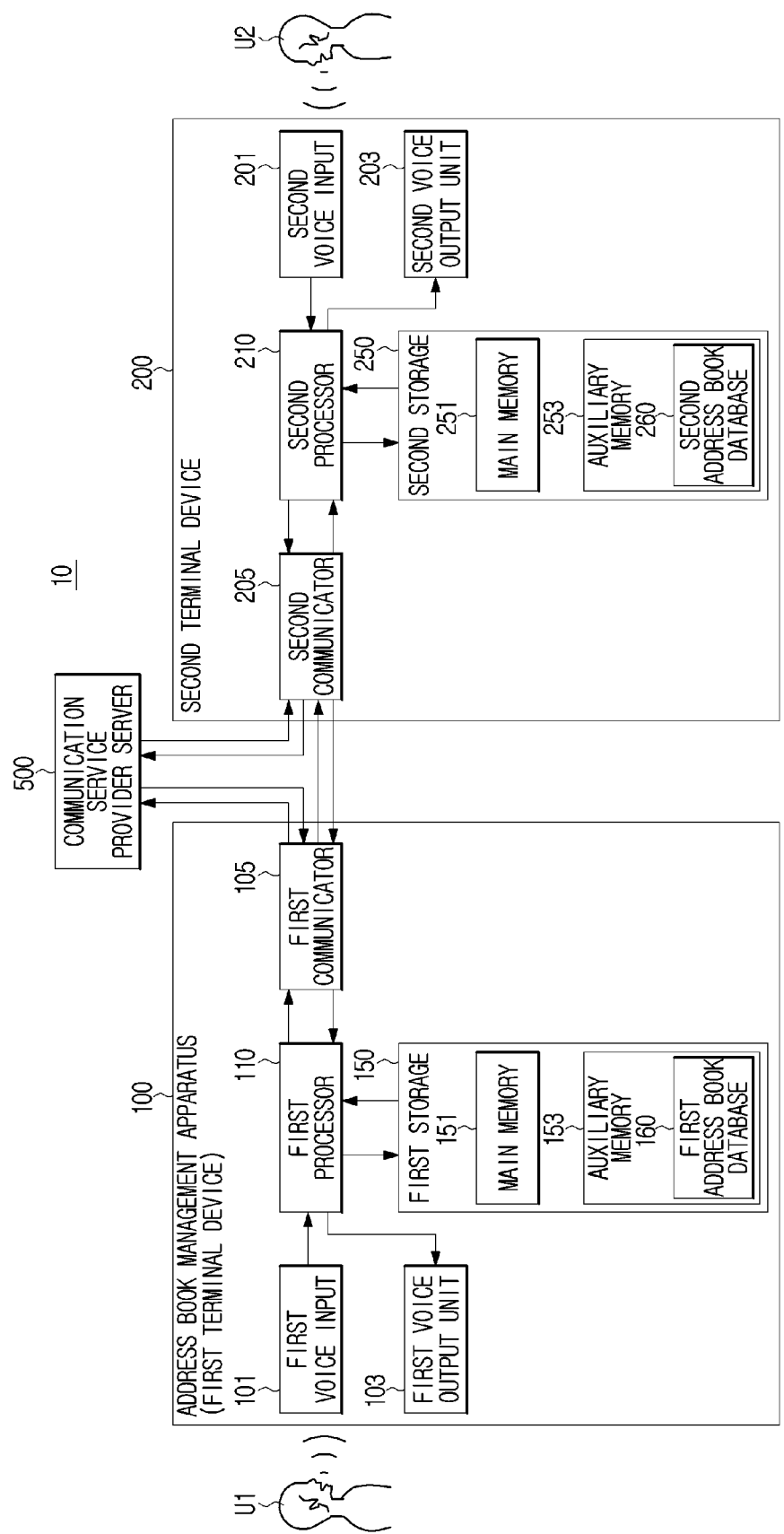
FIG. 1 is view illustrating an embodiment of an address book management system using speech recognition.

FIG. 1 is view illustrating an embodiment of an address book management system using speech recognition.

Referring to FIG. 1, an address book management system to may include an address book management apparatus 100 and another terminal apparatus 200 (hereinafter refer to a second terminal device) apart from the address book management apparatus 100 and configured to receive a speech signal from the address book management apparatus 100 or configured to transmit a speech signal to the address book management apparatus 100 via a communication network. As needed, the address book management system to may further include a communication service provider server 500 mediating the communication between the address book management apparatus 100 and the second terminal device 200 and providing the communication service.

The address book management apparatus refers to an apparatus capable of modifying, changing and/or updating an address book by acquiring a keyword associated with an address book using at least one speaker's speech. The address book management apparatus 100 may be a terminal apparatus 100 (hereinafter referred to as a first terminal apparatus) as shown in FIG. 1. Hereinafter for convenience of description, the address book management apparatus 100 is referred to the first terminal apparatus.

The first terminal device 100, the second terminal device 200 and the communication service provider server 500 may perform mutual communication based on a wired communication network, a wireless communication network, or a combination thereof.

The wired communication network may be implemented by using a cable, e.g. a pair cable, a coaxial cable, an optical fiber cable or an Ethernet cable. The wireless communication network may be implemented by using a wireless communication technology based on at least one of short range communication technology and mobile communication technology. The short range communication technology may include CAN communication, Wi-Fi, Wi-Fi Direct, Bluetooth, zigbee, Bluetooth Low Energy, or Near Field Communication (NFC). The mobile communication technology may include a variety of wireless communication technology that is implemented by using a variety of mobile communication standards, e.g. 3GPP-based communication system, 3GPP2-based communication system, or Wi MAX-based communication system.

The first terminal device 100 may include electronics configured to input a voice and process the voice and configured to store an address book database 160. For example, the first terminal device 100 may be implemented using a smart phone, a cellular phone, a tablet PC, a desktop computer, a laptop computer, a portable game machine or a personal digital assistant (PDA).

According to an embodiment, the first terminal device 100 may include a first voice input 101, a first voice output unit 103, a first communicator 105, a first processor 110, and a first storage 150.

The first voice input 101 may receive speech uttered by a first user (u1), convert the received speech into an electrical signal (hereinafter refer to a speech signal), and output a first speech signal corresponding to the speech of the first user (u1). The speech signal may be transmitted to the processor 110 via a cable or a wireless communication network.

According to an embodiment, the first voice input 101 may be configured to continue to receive speech from a certain point of time according to a predetermined setting. For example, from when the first terminal device 100 makes a call to the second terminal device 200 or a call is generated between the first terminal device 100 and the second terminal device 200, the first voice input 101 may continuously or periodically receive the speech of the first user (u1) and output a speech signal corresponding to the speech.

The first voice input 101 may be implemented using a microphone.

The first voice output unit 103 may convert a second speech signal corresponding to speech of a second user (u2), which is received from the second terminal device 200, into a sound wave, output the sound wave to the outside, and provide the speech of a second user (u2) to the first user (u1) in an audio manner. The first voice output unit 103 may further output the speech signal from the first user (u1) or output a result of process performed by the processor 110, e.g., a result of updating the first address book database 160, as a voice or a sound corresponding to the voice.

The first voice output unit 103 may be implemented using a speaker, an earphone or a headset.

The first communicator 105 may be configured to communicate with at least one of the second terminal device 200 and the communication service provider server 500. The first communicator 105 may be implemented by using a component corresponding to the communication technology employed by the first terminal device 100, wherein the component may include communication chips, antennas and related components.

The first communicator 105 may transmit the first speech signal corresponding to the speech uttered by the first user (u1), to a second communicator 205 of the second terminal device 200 directly or indirectly via the communication service provider server 500. The first communicator 105 may transmit the second speech signal corresponding to the speech uttered by the second user (u2), to the second communicator 205 of the second terminal device 200 directly or indirectly via the communication service provider server 500.

The first processor 110 may control an overall operation of the first terminal device 100. According to an embodiment, the first processor 110 may modify, change and/or update an address book using at least one of the first speech signal and the second speech signal.

The first processor 110 may be pre-programmed for the above mentioned process or drive the programs stored in the first storage 150 for the above mentioned process. The processor 110 may be electrically connected to the first voice input 101, the first voice output unit 103, the first communicator 105, and the first storage 150 to send and receive data.

The first processor 110 may be implemented using at least one central processing unit (CPU), at least one micro controller unit (MCU) or at least one electronic control unit (ECU).

The detailed operation of the first processor 110 will be described late.

The storage 150 may be configured to store various data in a predetermined format. For example, the storage 150 may store the information or program necessary for the operation of the first processor 110, and may also store the first address book database 160.

The storage 150 may include a main memory 151 temporarily storing various data and programs and an auxiliary memory 153 non-temporarily storing various data and programs.

According to an embodiment, when an expected value obtained by the processor 110 is less than a predetermined first reference value and greater than a predetermined second reference value, the main memory 151 may temporarily store the obtained keyword (e.g., at least one of a first keyword and a second keyword), and provide the stored expected value to the processor 110 according to the call of the processor 110.

FIG. 2 is a view illustrating an embodiment of an address book database.

The auxiliary memory 153 may store the first address book database 160.

As illustrated in FIG. 2, the first address book database 160 may be established by at least one contact and at least one data corresponding to the contact. At least one contact may include at least one of a phone number, a mobile number, an email address, and a social network account. At least one data corresponding to each of the contact may include name, organization, occupation, job title and a relationship with the first user (u1).

The first address book database 160 may include at least one address book record 161, 163, 165, and 167 which is stored according to an identifier, e.g., a contact. Each address book record 161, 163, 165, and 167 may include at least one field. The at least one field may be configured to store data in the form of characters, and symbols, and/or number corresponding to a predetermined field name. For example, the first address book database 160 may include a plurality of fields, e.g., a name (a1), an organization (a2), a job position/title (a3) and a relationship field (a4) with the first user (u1) and a contact field (as), and information corresponding the name, the organization, the job position/title and the relationship field and the contact field may be recorded in each field. According to embodiments, first and last names may be stored in separate fields.

The second terminal device 200 may include electronics configured to communicate with the first terminal device 100. For example, the second terminal device 200 may include a smart phone, a cellular phone, a tablet PC, a desktop computer, a laptop computer, a portable game machine or a personal digital assistant device (PDA).

According to embodiments, the second terminal device 200 may be operated as the address book management apparatus but is not limited thereto.

According to an embodiment, the second terminal device 200 may include a second voice input 201, a second voice output unit 203, a second communicator 205, a second processor 210, and a second storage 250.

The second voice input 201 may receive speech uttered by a second user (u2), and output a second speech signal corresponding to the received speech, and the second voice output unit 203 may convert the first speech signal of the first user (u1), which is received by the second communicator 205, into a sound wave and provide the sound wave to the second user (u2) in an audio manner.

The second communicator 205 may be configured to communicate with at least one of the first terminal device 100 and the communication service provider server 500. Accordingly, the second terminal device 200 may transmit the second speech signal of the second user (u2), to the first terminal device 100 or receive the first speech signal of the first user (u1) from the first terminal device 100.

The second processor 210 may perform an overall operation of the second terminal device 200. According to embodiments, the second processor 210 may be set to modify, change and/or update an address book using at least one of the first speech signal and the second speech signal.

The second storage 250 may be configured to store various data. The second storage 250 may include a main memory 251 and an auxiliary memory 253. The main memory 251 may temporarily store the obtained keyword (e.g., at least one of a first keyword and a second keyword). The auxiliary memory 253 may store a second address book database 260 related to the second user (u2), as illustrated in FIG. 1.

The above-described second sound input 201, second voice output unit 203, second communicator 205, second processor 210 and second storage 250 respectively, may be implemented using components the same as or different from the first voice input 101, the first voice output unit 103, the first communicator 105, the processor 110, and the first storage 150.

The communication service provider server 500 may be connected to the first terminal device 100 and the second terminal device 200 to communicate with each other. The communication service provider server 500 may interconnect a communication line connected to the first terminal device 100 with a communication line connected to the second terminal device 200 so that the first terminal device 100 and the second terminal device 200 send and receive various data including at least one of the first and second speech signals. The communication service provider server 500 may be implemented by using a desktop computer or a predetermined computing device that is specially designed.

Hereinafter a process of updating the first address book database 160 by an operation of the processor 110 of the first terminal device 100 will be described in detail. A method applied to the process of updating the first address book database 160 by an operation of the processor 110 may be applied to a process of updating the second address book database 260 by an operation of the second processor 210 without changes or with a little modification. In addition, the method applied to the process of updating the first address book database 160 by an operation of the processor 110 may be applied to a process of updating an address book database provided in the communication service provider server 500 by an operation of a processor provided in the communication service provider server 500 without changes or with a little modification.

Figure 3A:
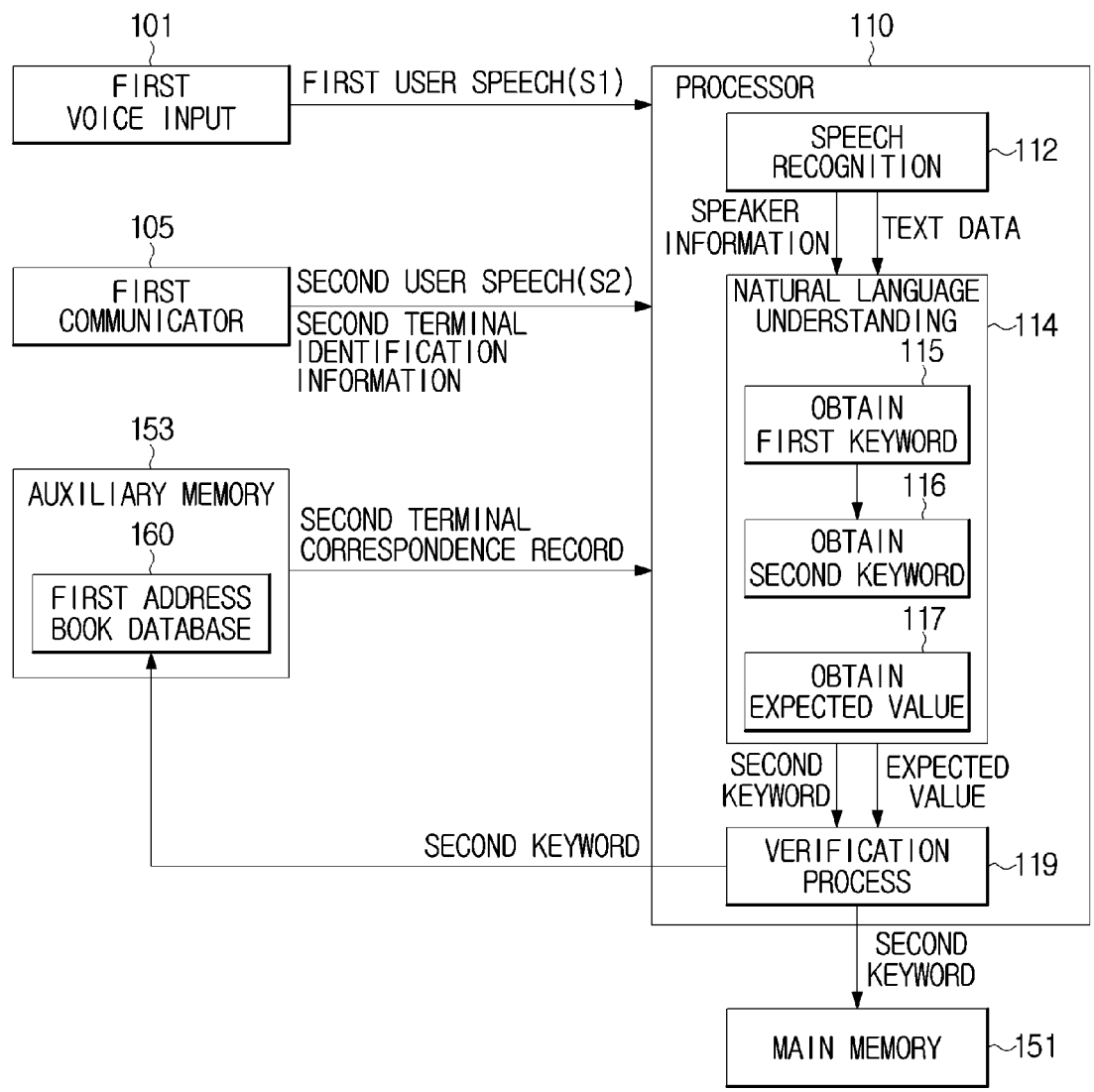
FIG. 3A is a block diagram illustrating an embodiment of an address book management apparatus.

FIG. 3A is a block diagram illustrating an embodiment of an address book management apparatus.

As illustrated in FIG. 3A, when the first voice input 101 transmits the first speech signal (s1) of the first user (u1) and/or the first communicator 105 transmits the second speech signal (s2) of the second user (u2), the processor 110 may perform the speech recognition about at least one of the first speech signal (s1) and the second speech signal (s2) (112).

The processor 110 may perform the speech recognition to obtain utterance in a text type corresponding to at least one of the first speech signal (s1) and the second speech signal (s2) which are input.

The processor 110 may perform the speech recognition on at least one of the first speech signal (s1) and the second speech signal (s2) using the speech recognition engine. The speech recognition engine is a device or a program configured to recognize speech uttered by a user by applying a speech recognition algorithm to the input voice and configured to generate a result of the recognition.

According to an embodiment, the processor 110 may perform the speech recognition based on a speech signal for a certain speech section. In other words, the processor 110 may analyze not the speech signal corresponding to all speech, but the speech signal corresponding to some speech uttered by the first user (u1) and second user (u2). The speech section may be defined based on a section in which speech uttered by a user is present or there is high possibility of having speech uttered by a user.

According to an embodiment, a certain speech section may include an initial portion of the first speech signal (s1) and an initial portion of the second speech signal (s2). In other words, the certain speech section may include a certain period from when the first user (u1) is firstly uttered, in the first speech signal (s1) and/or may include a certain period from when the second user (u2) is firstly uttered, in the second speech signal (s2).

A speaker usually speaks data related to the address book in early stage, wherein the data includes a name, a nickname, an appellation, a job position and title of a speaker or other party, or various words and phrases which are conventionally used. Therefore, by using the initial section of the first and second speech signal (s1 and s2), it may be possible to obtain information, e.g., a first keyword, for updating the first address book database 160. When the required information is not obtained in the initial section, the processor 110 may acquire information for updating the first address book database 160 from a section longer than the initial section. For this, at least one of the first speech signal (s1) and the second speech signal (s2) may be continuously temporarily stored in the storage 150.

The processor 110 may extract the feature of the speech from the speech section. In this case, the processor 110 may obtain the feature of the speech (e.g., feature vector) from the speech section by using at least one of Linear Prediction Coefficient (LPC), cepstrum, Mel Frequency Cepstral Coefficient (MFCC), and filter bank energy.

In response to the extraction of the feature of the speech, the processor 110 may obtain a result of the recognition corresponding to the extracted feature of the speech. In this case, the processor 110 may obtain the result of the recognition by determining a pattern corresponding to the extracted feature by comparing the extracted feature with a pre-learned pattern.

Particularly, the processor 110 may determine a pattern of the feature of the speech using a predetermined certain acoustic model. Acoustic model may be obtained by modeling signal characteristics of the speech in advance. The processor 110 may obtain a frequency pattern, which is the same as or similar with at least one frequency pattern of the first speech signal and the second speech signal, using the acoustic model so as to determine the pattern about the feature of the speech. Accordingly, the processor 110 may recognize vocabularies, e.g., certain words, syllables, or short phases, from the input speech.

Acoustic model may be configured to determine a pattern according to at least one of direct comparison method and statistical model method. The direct comparison method may be configured to set a recognition target as a feature vector model and directly compare the feature vector model with the feature vector of the speech data. The direct comparison method may include a vector quantization. The statistical model method may be configured to statistically process the feature vector of the recognition target and include Dynamic Time Warping (DTW), Hidden Markov Model (HMM), or a method using a neural network.

When the feature of the speech is extracted, the processor 110 may obtain information related to the speaker (i.e., at least one of the first user (u1) and the second user (u2)) based on the extracted feature. For example, the processor 110 may determine the gender or age of the speakers (u1 and u2) based on the feature of the speech.

As needed, the processor 110 may perform the speech recognition by using a language model. Accordingly, the processor 110 may recognize a sentence. The language model may be generated based on human language and grammar to determine linguistic order relations among the recognized word, syllable or phrase. When performing the speech recognition using the language model, errors in the speech recognition of the processor 110 may be reduced. The language model may include a statistical language model or a model based on a finite state network (FSA).

According to an embodiment, the processor 110 may perform the speech recognition using N-best search method in which the acoustic model and the speech mode are integrated.

At least one of the acoustic model and the language model may be obtained by a certain learning algorithm. The certain learning algorithm may be implemented by employing at least one of Deep Neural Network (DNN), Convolutional Neural Network (CNN), Recurrent Neural Network (RNN), Deep Belief Network, (DBN), and Deep Q-Networks.

The processor 110 may further calculate a confidence value. Confidence value indicates how trustworthy the speech recognition result is. Reliability may be defined by a relative value about a possibility in which a certain speech is uttered from other phoneme or word with respect to the phoneme or word that is result of the recognition. The confidence value may be represented as a value between 0 and 1 according to the designer's choice, but is not limited thereto. When the confidence value is calculated, the processor 110 may compare the confidence value with a predetermined threshold and discard the result of the language recognition according to a result of the comparison.

The processor 110 may use the acoustic model and obtain data in a text type corresponding to at least one of the first speech signal (s1) and the second speech signal (s2) according to the result of the speech recognition using the language model, as needed.

When the data in the text type and information related to the speaker (u1 and u2) are obtained, the processor 110 may sequentially perform a natural language understanding (114).

According to the performance of the natural language understanding, the processor 110 may obtain the first keyword from the utterance and figure out an intention of the first user (u1) and the second user (u2) contained in the utterance.

Particularly, the processor 110 may perform morphological analysis about the obtained utterance in the text type in order to obtain the first keyword and/or identify the intention. A morpheme is the smallest unit of meaning and represents the smallest meaning element that is not divided. As needed, the processor 110 may further obtain a domain based on a result of the morphological analysis. The domain may represent that content (e.g., word, phase, or sentence) uttered by the user (u1 and u2) is classified by a predetermined category.

The processor 110 may identify named entity from the utterance and determine the type of the identified object name so as to recognize the named entity from the uttered content. The named entity may include proper nouns such as person, location, organization, time, date, currency, etc. The processor 110 may figure out the meaning of the sentence by extracting keywords from the sentence through the named entity recognition.

The processor 110 may browse an extracted keyword database provided in advance for the named entity recognition. The extracted keyword database may be established by having proper nouns, such as person, location, organization, time, date, currency, etc.

In addition, the processor 110 may recognize the intention of the user (u1 and u2) by analyzing the speech act of the utterance. According to the result of the speech act, the processor 110 may recognize the intention of the utterance of the user (u1 and u2) among a query, a request or a response.

It may be possible to obtain the first keyword based on the result of the morphological recognition and the named entity recognition (115). The first keyword refers to words, phrases, sentences or other extractable phrases related to the updating of the first address book database 160 among the words, phrases, sentences or other extractable phrases directly extracted from the uttered content. For example, the first keyword may include name of person, company, goods, electronics or mechanism, nickname, appellation, job title, position, or other conventional various kinds of words or phrases, etc.

According to an embodiment, during at least one of the above-described morphological recognition, named entity recognition and the speech act analysis is performed to obtain the first keyword, a predetermined learning algorithm may be used. The predetermined learning algorithm may be implemented based on at least one of Deep Neural Network (DNN), Convolutional Neural Network (CNN), Recurrent Neural Network (RNN), Deep Belief Network, (DBN), and Deep Q-Networks.

According to an embodiment, when the first keyword is determined, the processor 110 may determine the second keyword (116). The second keyword may include words, phrases, sentences, or any other possible phrase added to actual first address book database 160.

In other words, the first keyword may represent words, phrases and/or sentences extracted directly from the utterance of the user (u1 and u2), and the second keyword may represent words, phrases and/or sentences to be added to the first address book database 160.

The second keyword may be pre-defined by a user or a designer according to a field name of the first address book database 160, or alternatively, the second keyword may be obtained from the learning process. For example, the second keyword may include a plurality of field names, e.g., words, phrases, or sentences corresponding to the name (a1), the organization (a2), the position/title (a3) and the relationship (a4).

The second keyword may be determined based on various conditions and information, e.g., which is the extracted first keyword, or is a call made by the first user (u1) or is a call made by the second user (u2).

According to conditions, the processor 110 may determine the second keyword identical to the first keyword. In other words, the second keyword may be made of the same word, phrase or sentence in the first keyword. For example, when the first keyword is "John," the processor 110 may determine the second keyword as "John."

In addition, the processor 110 may determine the second keyword by further adding a predetermined symbol, e.g., a character, to the first keyword. For example, when the first keyword is 'John', the processor 110 may determine the second keyword as 'Sir. John' by adding 'sir' in front 'John.

In addition, the processor 110 may determine the second keyword by using a part of the first keyword. For example, when the first keyword is 'Sir. John', the processor 110 may determine the second keyword as 'John' by removing 'sir' from the front side of 'Sir. John'.

The processor 110 may determine the second keyword by using the relationship between the first user (u1) and the second user (u2), which is determined based on the first keyword and the spoken dialogue. For example, the first keyword may be an appellation used between the first user (u1) and the second user (u2). The processor 110 may determine the relationship between the first user (u1) and the second user (u2) based on the appellation and determine the second keyword as words, phases, or sentences corresponding to the determined relationship.

Particularly, for example, during the call, when the second user (u2) calls the first user (u1) 'daddy', the first keyword may be determined as 'daddy' and the second keyword may be determined as 'child' by corresponding to 'daddy'. Accordingly, 'child' may be added to the first address book database 160.

In order to determine the relationship between the first user (u1) and the second user (u2), the processor 110 may read information (hereinafter refer to relationship information) related to additional provided information. The processor 110 may determine the second keyword from the first keyword based on the result of the reading.

The relationship information may be defined by including an appellation and a relationship corresponding to the appellation. For example, the relationship information may include a word, e.g., 'honey', 'missis' or wife's name, and further include 'wife' which corresponds to the word and represents a relationship. The relationship information may include a word, e.g., 'honey', and 'husband' and further include 'husband' which corresponds to the word and represents a relationship. For another example, the relationship information may include an appellation which is used for a child to call his or her parents, e.g. 'daddy', 'mommy', 'farther', and 'mother', and 'parent' corresponding to the appellation and representing the relationship. In addition, the relationship information may include an appellation which is used for parents to call his or her child, e.g. 'son', and 'daughter', 'farther', and 'parent' corresponding to the appellation and representing the relationship. The relationship information may be established by including a relationship with a specific person, and an expression (words, phrases or sentences) that is called by corresponding to the relationship.

In addition, the second keyword may be determined based on the first keyword by using a variety of methods considered by the designer.

According to embodiments, a process of obtaining the second keyword (116) may be omitted.

FIG. 3B is a table illustrating an expected value about the obtained first keyword.

When the first keyword or the second keyword is acquired, the processor 110 may obtain an expected value (A) corresponding to the first keyword and the second keyword (117).

As mentioned above, when the processor 110 obtains the first keyword and the second keyword using the learning algorithm, the processor 110 may further obtain a probability output value as well as the first keyword and the second keyword. The obtained probability output value may be determined as an expected value (A).

For example, as for the learning algorithm based on the deep neural network, a plurality of input value may be input to an input layer and the plurality of input value each may be transmitted to an output layer from the input layer via at least one hidden layer. In the hidden layer, the plurality of input value each may be weighted sum. A certain activation function may be applied to the value transmitted to the output layer. A value obtained according to the application of the activation function may be illustrated by the probability, and represent the accuracy of the first keyword or the second keyword. The processor 110 may determine a result value obtained by the application of the activation function, as an expected value (A).

Accordingly, an expected value (A) of the first keyword and an expected value (A) of the second keyword corresponding to the first keyword may be determined.

Figure 6:
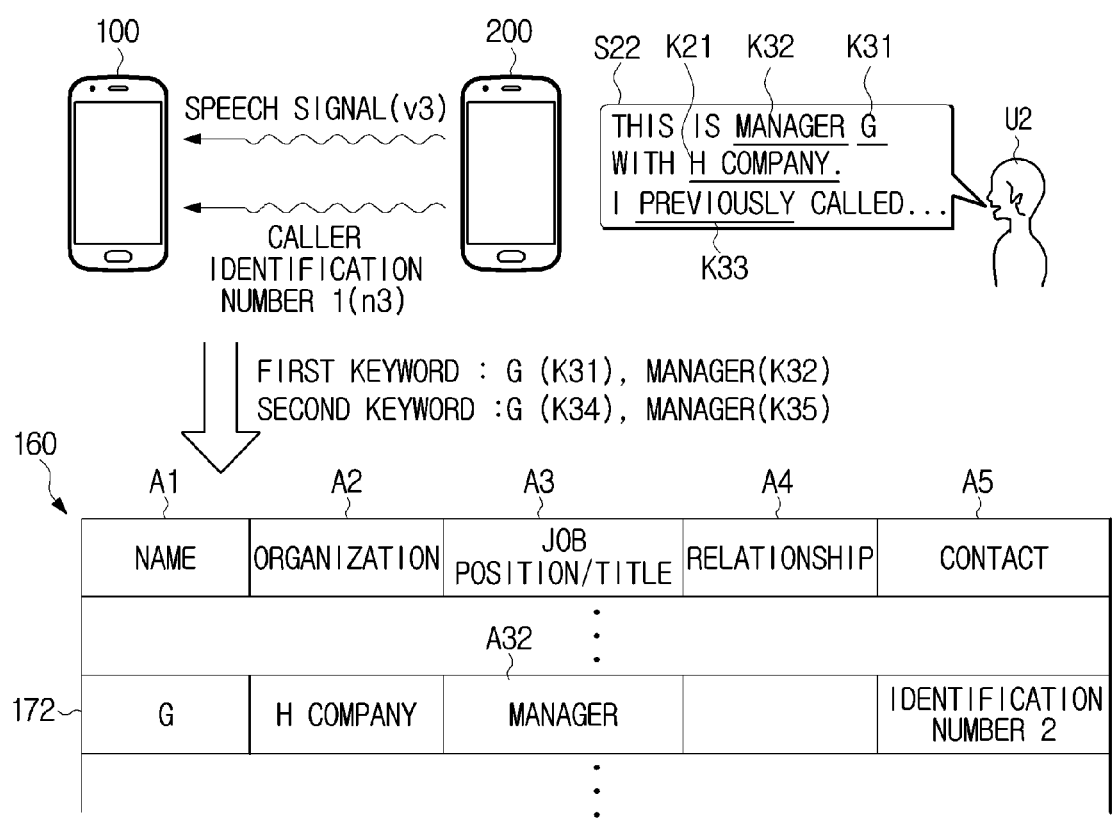
FIG. 6 is a view illustrating a third example of the update process of the address book.

For example, as illustrated in FIG. 6, when a certain utterance (s22) is input when the second user (u2) makes a call, a word, e.g., 'G' (K31), 'H company' (K21), 'manager' (K32), and 'previous' (K33), may be detected from the utterance (s22), as the first keyword by corresponding to each field, e.g., name field, company field, job position/title field, and relationship field. As a result of applying the learning algorithm when extracting the first keyword, expected values corresponding to the first keyword, e.g., 'G' (K31), 'H company' (K21), 'manager' (K32), and 'previous' (K33) may be obtained. For example, when the first keyword corresponding to name is 'G', an expected value (A1)

may be 0.92, and when the first keyword corresponding to company is 'H company', an expected value (A2) may be 0.83.

According to an embodiment, addition to the mentioned probability value, the expected value may be implemented using a variety of functions considered by the designer.

When the expected value (A) is obtained as mentioned above, the processor 110 may verify the first keyword or the second keyword that is obtained by using the expected value (119).

Particularly, the processor 110 may compare the obtained expected values (A; A1 to A4) with at least one reference value which is predetermined by a designer or a user. The processor 110 may verify the second keyword based on a result of the comparison.

The at least one reference value may include a first reference value, and a second reference value. The first reference value may be defined as 0.8 and the second reference value may be defined as 0.3. However, the first reference value and the second reference value are not limited thereto and thus the first reference value and the second reference value may vary according to the designer's selection.

The processor 110 may compare the obtained expected value (A) with the first reference value. When the expected value (A) is greater than the first reference value (according to embodiments, it may include a case in which the expected value (A) is equal to the first reference value), it may be determined that the obtained second keyword is appropriate. The processor 110 may add the second keyword to the first address book database 160 and update the first address book database 160.

When the second keyword is obtained, the processor 110 may determine at least one record 161, 163, 165, and 167, to which the second keyword is added, among the at least one record 161, 163, 165, and 167 of the first address book database 160. The determination may be performed by using an identification number about the second terminal device 200, e.g., a phone number and an e-mail address. The processor 110 may determine a field name (a1 to a5) corresponding to the second keyword. In other words, the processor 110 may determine a field name corresponding to the second keyword among the field name (a1 to a5) of the first address book database 160. The processor 110 may detect a field corresponding to the field name (a1 to a5) which is determined from the determined address book record 161, 163, 165, and 167. The processor 110 may add the second keyword to the detected field. Accordingly, the update of the first address book database 160 may be performed.

According to embodiments, the processor 110 may determine whether information is already recorded on the detected field, as mentioned above.

When the detected field is a blank field since information is not detected in the detected field, the processor 110 may update the first address book database 160 by adding the second keyword to the detected field.

When information is already recorded in the detected field, the processor 110 may terminate the update process of the first address book database 160 and discard the second keyword according to at least one selection of the designer and the user. The processor 110 may update the first address book database 160 by removing the stored data from the detected field and by adding the second keyword to the detected field. As needed, when information is already recorded in the detected field, the processor 110 may firstly ask a user about whether to update the first address book database 160 using the second keyword.

The processor 110 may compare the obtained expected value (A) with the first reference value and the second reference value. When the expected value (A) is less than the first reference value and greater than the second reference value, it may be determined that it is difficult to determine whether the obtained second keyword is appropriate. The processor 110 may temporarily store the obtained second keyword in the storage 150, e.g., the main memory 151. The second keyword temporarily stored may be re-used according to a result of analyzing other utterance or used to obtain the result of analyzing other utterance. Other utterance may be obtained from the same call or another call.

The processor 110 may compare the obtained expected value (A) with the second reference value. When the expected value (A) is less than the second reference value, it may be determined that the obtained second keyword is inappropriate. In this case, the obtained second keyword may be discarded.

Using the above mentioned process, the first address book database 160 may be automatically updated based on the voice call between the users (u1 and u2). Accordingly, although it is difficult for the first user (u1) to directly operate the first terminal device 100, e.g., the first user (u1) is driving a vehicle, it may be possible to quickly and easily update the first address book database 160 without manual operation by the first user (u1).

Hereinafter a variety of examples of the update process of the address book will be described.

Figure 4:
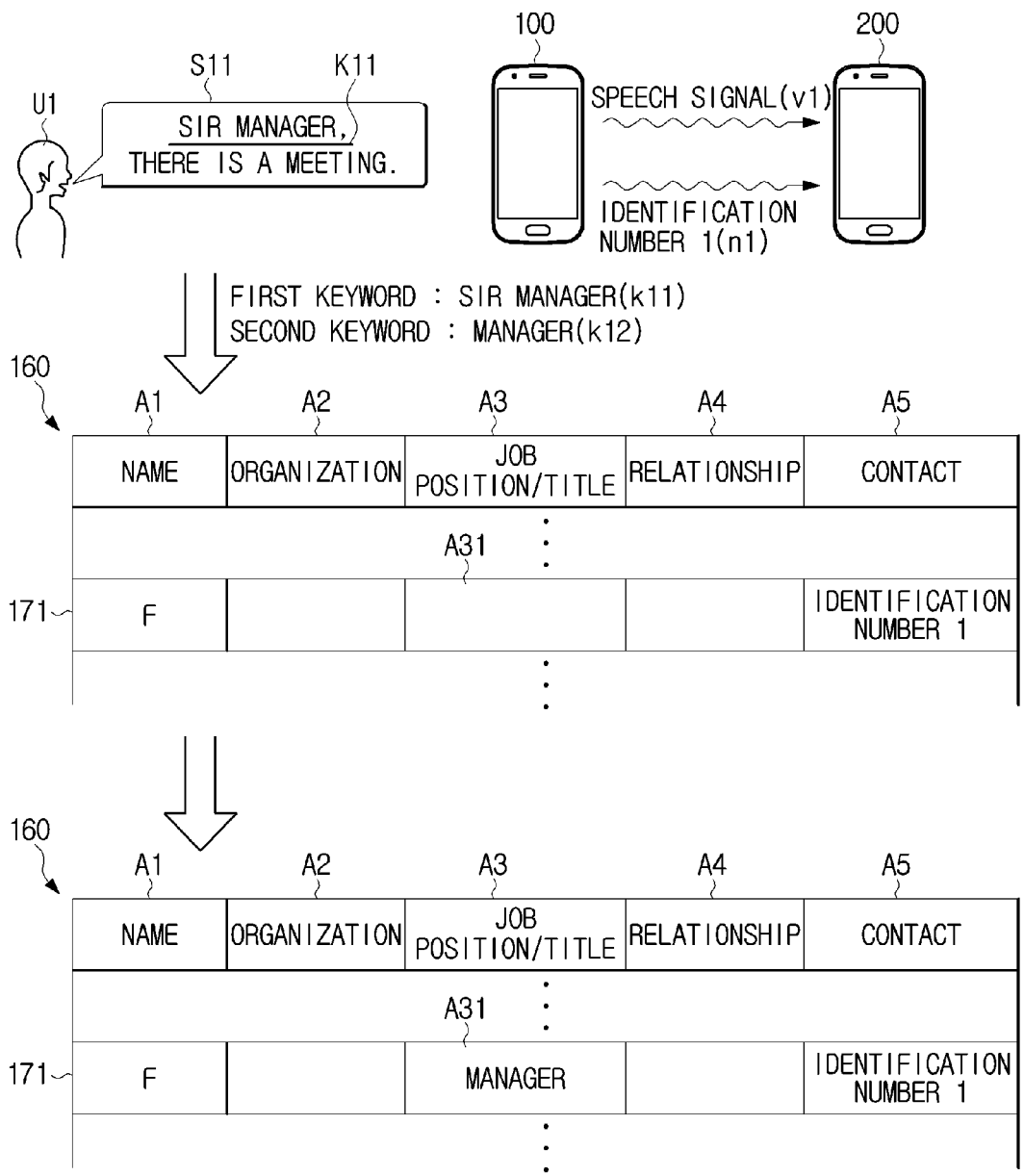
FIG. 4 is a view illustrating a first example of the update process of the address book.

FIG. 4 is a view illustrating a first example of the update process of the address book. FIG. 4 is a view for explaining updating at least one field (a31) of the first address book record 171 previously stored in the first address book database 160.

As illustrated in FIG. 4, the first terminal device 100 of the first user (u1) and the second terminal device 200 of the second user (u2) may be connected to communicate with each other. The first terminal device 100 may make a call or the second terminal device 200 may make a call. When the first terminal device 100 makes a call, the identification number (n1) about the second terminal device 200, e.g., a phone number, may be input to the first terminal device 100 prior to making a call. When the second terminal device 200 makes a call, the identification number (n1) about the second terminal device 200, e.g., a phone number, in the electrical signal type, may be transmitted to the first terminal device 100 together with a speech signal.

After the first terminal device 100 of the first user (u1) and the second terminal device 200 of the second user (u2) are connected to communicate with each other, the first user (u1) may utter an utterance (s11) including a word (k11) related to a job title of the second user (u2) or the second user (u2) may utter an utterance including a word related to a job title of the second user (u2).

A speech signal (v1) corresponding to the utterance (s11) may be input to the first terminal device 100. The processor 110 of the first terminal device 100 may analyze the utterance (s11) and obtain the first keyword (k11), e.g., 'sir, manager'. As predetermined, the processor 110 may obtain the second keyword (k12) corresponding to the first keyword (k11). For example, the processor 110 may remove 'sir'

When the second keyword (k12) is determined to be appropriate according to the verification result, the processor 110 may determine a field corresponding to the second keyword (k12). For example, the processor 110 may determine 'manager' as what is related to job position/title.

Before or after the second keyword is determined, the processor 110 may determine a certain address book record 171 to which the second keyword is added, based on the identification number about the second terminal device 200.

When the field name of the address book record 171 is determined, the processor 110 may add the second keyword, e.g., 'manager', to at least one field (a31) corresponding to the determined field name. Accordingly, new information, e.g., data related to job position/title may be added to the address book record 171 related to the second terminal device 200, and thus the first address book database 160 may be updated.

Figure 5:
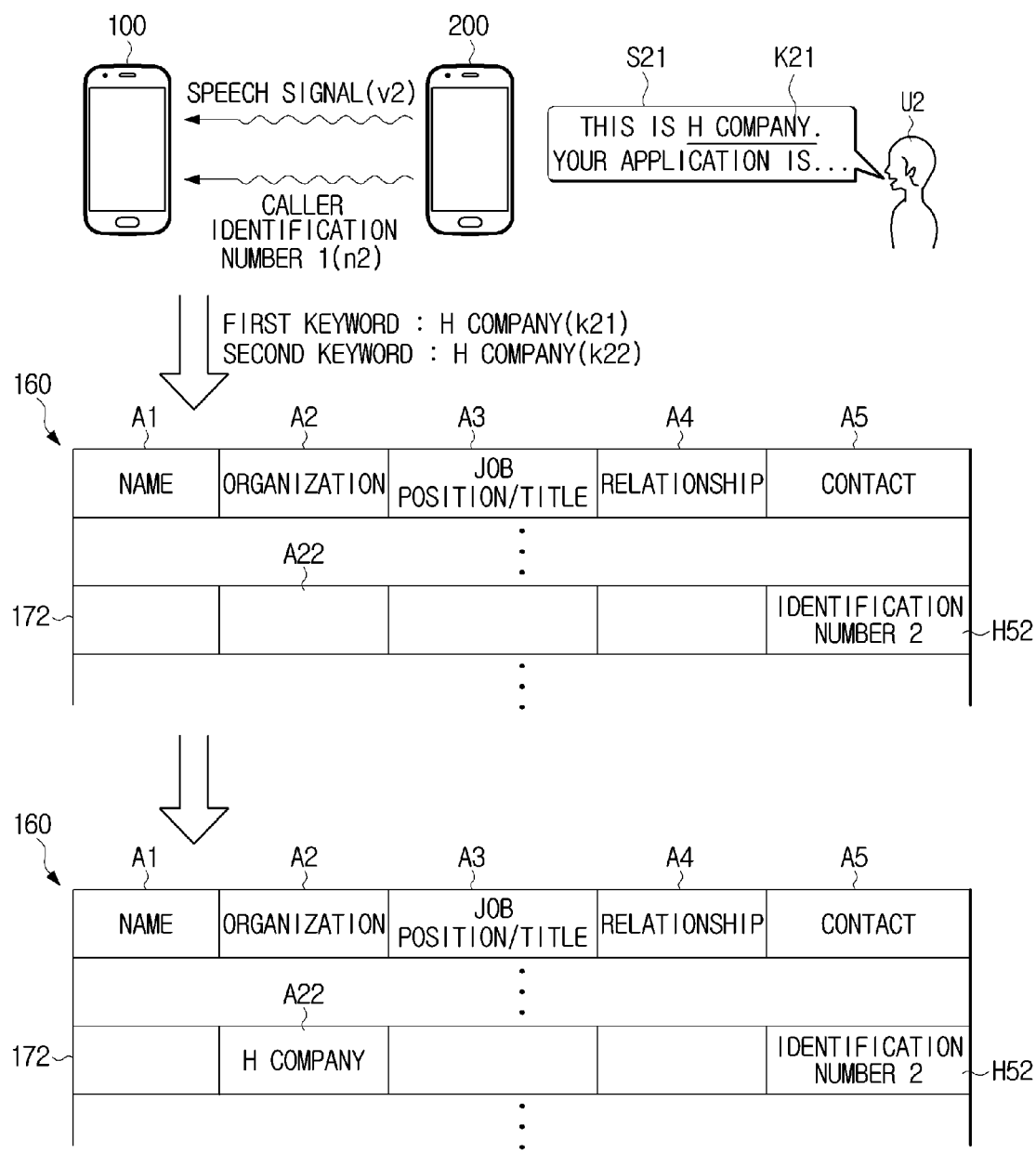
FIG. 5 is a view illustrating a second example of the update process of the address book.

FIG. 5 is a view illustrating a second example of the update process of the address book. FIG. 6 is a view illustrating a third example of the update process of the address book. FIG. 5 is a view for explaining a process of generating a new second address book record 172 in the first address book database 160, and FIG. 6 is a view for explaining a process of adding new data to the generated second address book record 172.

As illustrated in FIG. 5, the first terminal device 100 of the first user (u1) and the second terminal device 200 of the second user (u2) may be connected to communicate with each other. At least one of the first user (u1) and the second user (u2) may utter an utterance (s21) including a word (k21) related to a name, a job title, and organization of the second user (u2) and/or a relationship with the first user (u1).

For example, the second user (u2) may utter an organization of the second user (u2), e.g., 'H company' and a speech signal (v2) corresponding to the utterance may be transmitted to the first terminal device 100 from the second terminal device 200. In addition, the identification number (n2) of the second terminal device 200 may be transmitted to the first terminal device 100 from the second terminal device 200.

The processor 110 may read the first address book database 160. When an address book record corresponding to the identification number (n2) of the second terminal device 200 is not present in the first address book database 160, the processor 110 may generate an additional address book record to store data corresponding to the identification number (n2) of the second terminal device 200.

The processor 110 of the first terminal device 100 may analyze the utterance (s21) and detect the first keyword (k21), e.g., 'H company' and the second keyword (k22) corresponding to the first keyword (k21). In this case, the processor 110 may determine the second keyword (s22) as the same as 'H company'.

When the second keyword (k22) is determined to be appropriate according to the verification result, the processor 110 may determine a field name corresponding to the second keyword (k22), e.g., 'organization' (a2).

When the address book record 172 is generated and the field name corresponding to the second keyword (k22) is determined, the processor 110 may add the second keyword, e.g., 'H company', to the field (a22) corresponding to the address book record 172. The processor 110 may add the identification number (n2) of the second terminal device 200 to a contact field (h52) of the address book record 172.

Accordingly, the new record 172 may be generated and then added to the first address book database 160.

After a certain period of time, the first terminal device 100 of the first user (u1) and the second terminal device 200 of the second user (u2) are connected to communicate with each other, again, as illustrated in FIG. 6. At least one of the first user (u1) and the second user (u2) may utter an utterance (s31) including words (k21, k31, and k32) related to a name, a job position/title of the second user (u2) and/or a relationship with first user (u1).

For example, the second user (u2) may utter a name of the second user (u2), e.g., 'G', and a job title, e.g., 'manager', and the first terminal device 100 may receive the speech signal (v3) corresponding to the utterance, together with the identification number (n2) of the second terminal device 200.

The processor 110 may determine the address book record 172 to which the second keyword is added, from the first address book database 160, by using the identification number of the second terminal device 200. The processor 110 may determine the address book record 172 to which the second keyword is added, by using the words (k21, k31, and k32) detected from the utterance (s22). In this case, the processor 110 may search whether data is present in the address book record 172, wherein the data coincides with the words (k21, k31, and k32) detected from the utterance (s22), e.g., 'H company' (k21), in the pre-stored address book record. The processor 110 may determine the address book record 172 to which the second keyword is added, based on the search result.

The processor 110 may analyze the utterance (s22) and detect the first keyword (k31), e.g., 'G' and 'manager' from the utterance (s22). The processor 110 may obtain the second keyword (k34 and k35) corresponding to the first keyword (k31 and k32). In this case, for example, the processor 110 may determine the second keyword (k22) as the same as 'H company' and obtain the second keyword (k22).

The processor 110 may verify the second keyword (k34 and k35) and when it is determined that the determined second keyword (k34 and k35) is appropriate according to the verification result, the processor 110 may add the second keyword (k34 and k35) to a certain field of the address book record 172 corresponding to 'name' (a1) and 'job position/title' (a3).

Accordingly, the address book record 172 of the first address book database 160 may be updated.

Figure 7:
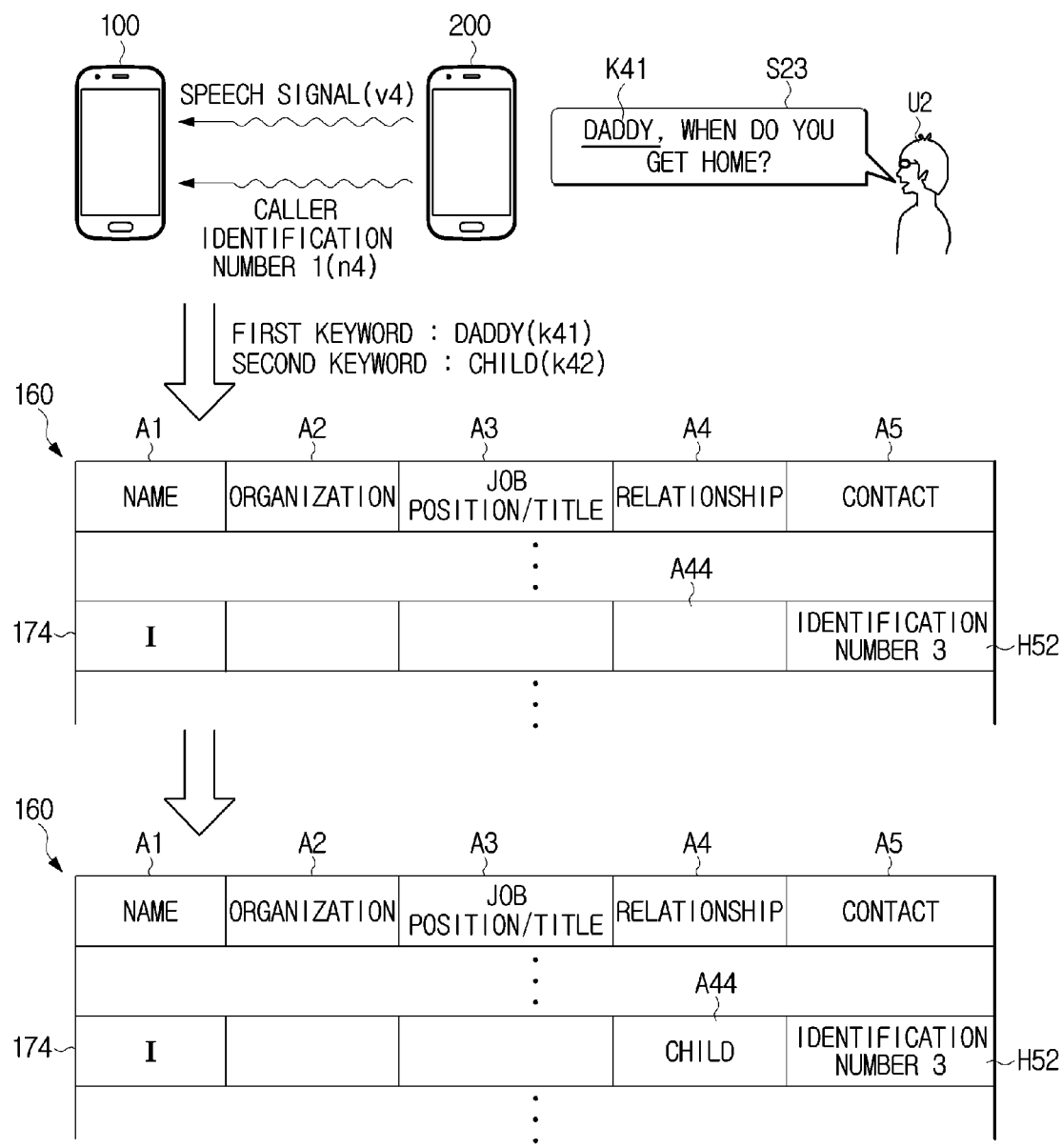
FIG. 7 is a view illustrating a fourth example of the update process of the address book.

FIG. 7 is a view illustrating a fourth example of the update process of the address book.

As illustrated in FIG. 7, the first terminal device 100 and the second terminal device 200 are connected to communicate with each other, the second user (u2) may utter an utterance (s23) including a word (k41) related to a relationship with the first user (u1), e.g., 'daddy'

A speech signal (v4) corresponding to an utterance (s23) and the identification number of the second terminal device 200 may be transmitted to the first terminal device 100 via the wired and wireless communication network.

The processor 110 may determine a certain address book record 174 to which the second keyword is added, based on the identification number of the second terminal device 200.

The processor 110 of the first terminal device 100 may analyze the utterance (s23) and obtain a first keyword (k41), e.g., 'daddy', related to the update of the first address book database 160.

The processor 110 may obtain a second keyword (k42) corresponding to the first keyword (k41). For example, as illustrated in FIG. 7, the processor 110 may read the relationship information and obtain the first keyword (k41), e.g., 'child' representing the relationship corresponding to 'daddy', contained in the utterance of the second user (u2). The processor 110 may determine the obtained word representing the relationship, as the second keyword (k42).

When it is determined that the second keyword (k42) is appropriate according to the verification result, the processor 110 may determine fields (a4 and a44) corresponding to the second keyword (k42), i.e., a field corresponding to a relationship field (a44).

The processor 110 may add the second keyword, e.g., 'child' (k42) to the relationship field (a44) of the address book record 174 corresponding to the second terminal device 200. Accordingly, data, e.g., 'child' may be added to the relationship field (a44) of the address book record 174 and the first address book database 160 may be updated.

Figure 8:
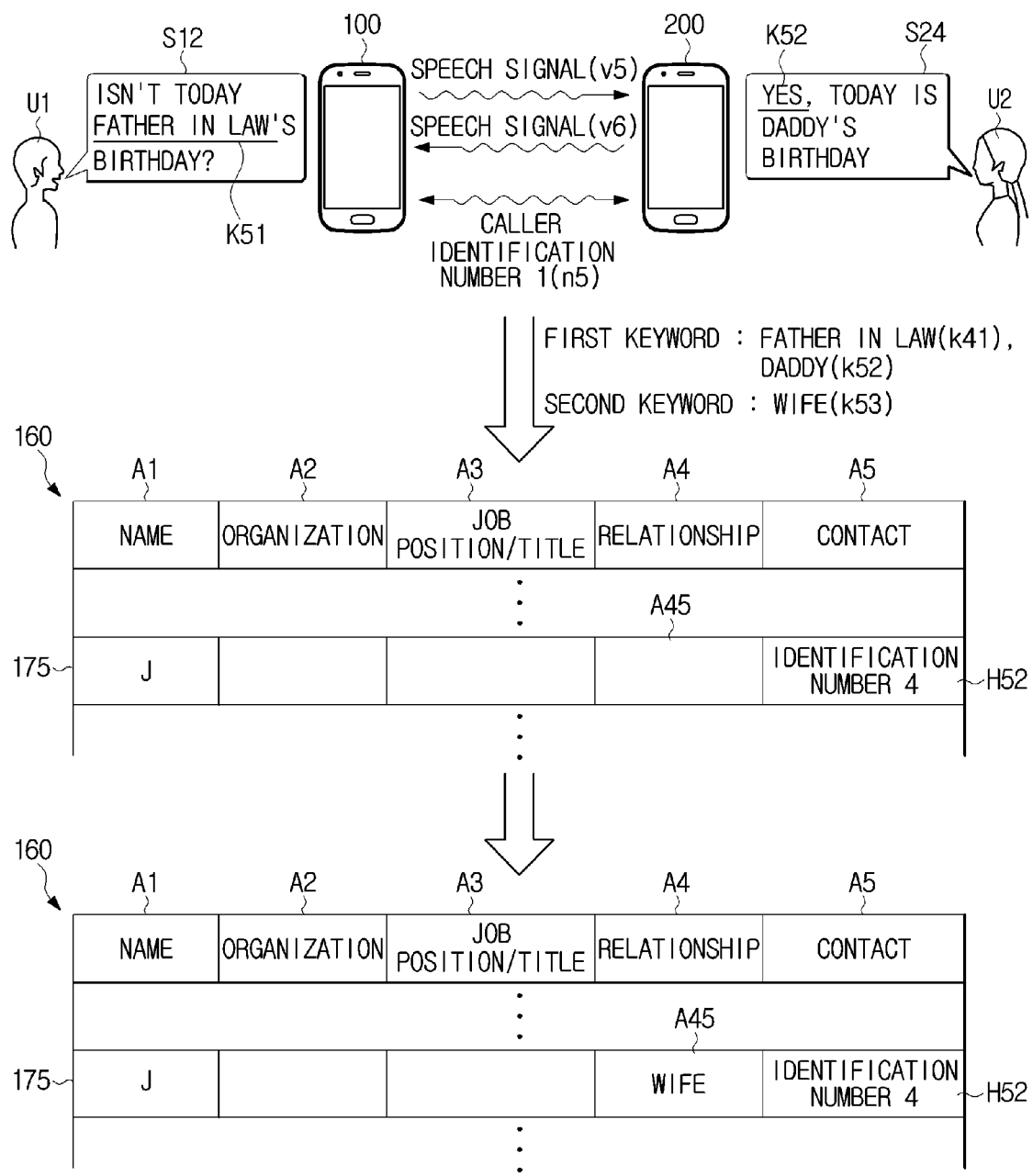
FIG. 8 is a view illustrating a fifth example of the update process of the address book.

FIG. 8 is a view illustrating a fifth example of the update process of the address book.

As illustrated in FIG. 8, after the first terminal device 100 of the first user (u1) and the second terminal device 200 of the second user (u2) are connected to communicate with each other, the first user (u1) and the second user (u2) may utter an utterance (k51 and k52) to make a conversation.

The processor 110 may determine a certain address book record 171 to which the second keyword (k53) is added, based on the identification number of the second terminal device 200.

The processor 110 may analyze a speech signal (v5) corresponding to the utterance (s12) of the first user (u1) and a speech signal (v6) corresponding to the utterance (s24) of the second user (u2), and obtain the first keyword (k51 and k52) from the each utterance (s12 and s24). For example, the processor 110 may extract and obtain at least one first keyword (k51), e.g., 'farther in law' from the utterance (s12) of the first user (u1) and the processor 110 may extract and obtain another first keyword (k52), e.g., 'daddy' from the utterance (s24) of the second user (u2).

As predetermined, the processor 110 may obtain the second keyword (k53) corresponding to the first keyword (k51 and k52), and read the relationship information. The processor 110 may detect and obtain an appropriate relationship, e.g., 'wife', from the first keyword (k51 and k52). In other words, the processor 110 may determine a relationship between the first user (u1) and the second user (u2) by considering a relationship, e.g., 'farther in law' between the first user (u1) and a target, and a relationship, e.g., 'daddy' between the second user (u2) and the same target.

Sequentially, the processor 110 may verify the second keyword (k53) and when it is determined that the second keyword (k53) is appropriate, the processor 110 may add the second keyword (k53) to a field corresponding to the address book record 175 of the second terminal device 200, e.g., a relationship field (a45). Accordingly, new information related to the relationship, e.g., 'wife' may be added to the address book record 175 related to the second terminal device 200. Therefore, the first address book database 160 may be properly updated.

Figure 9:
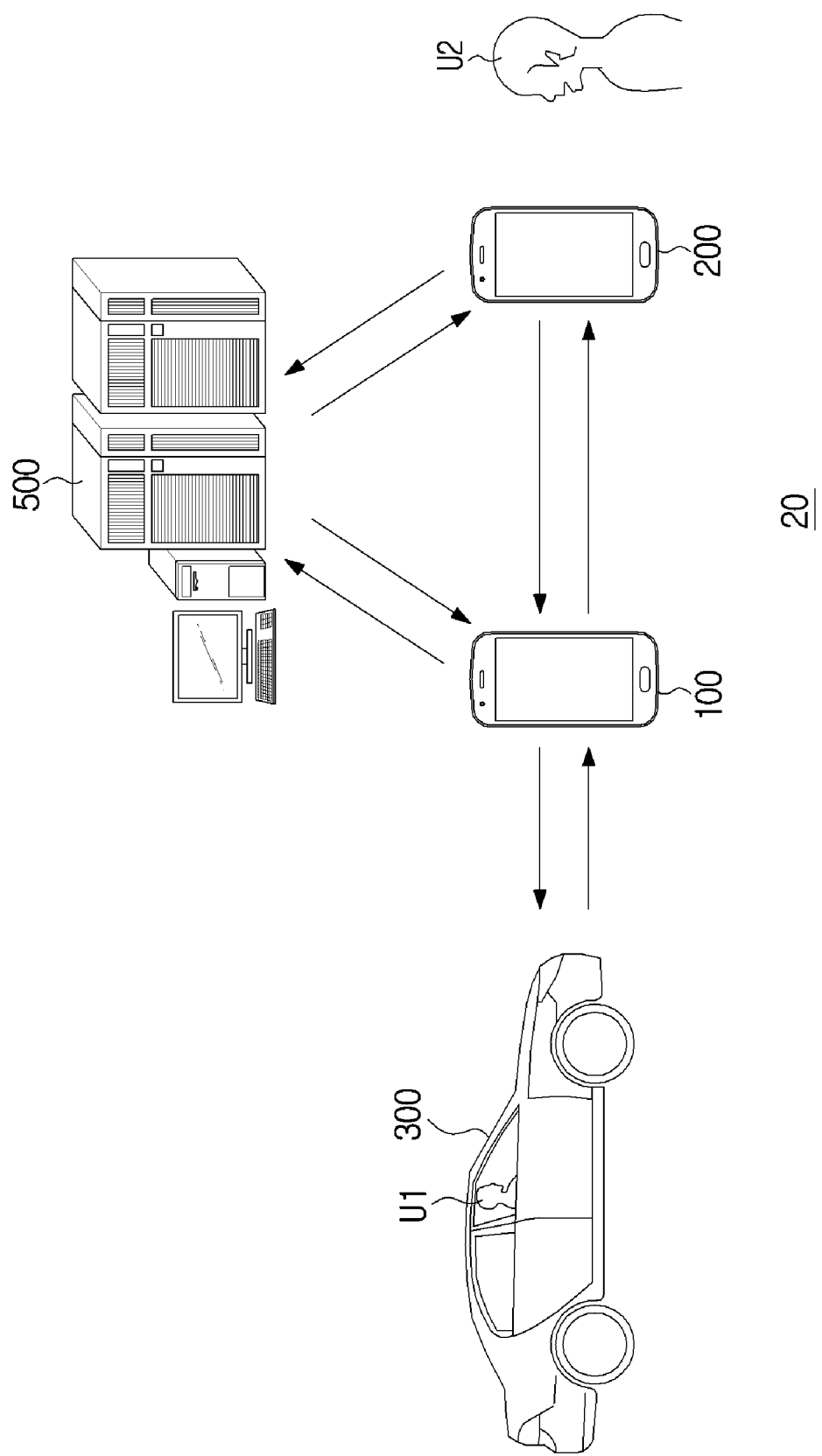
FIG. 9 is a view illustrating another embodiment of an address book management system using speech recognition, and FIG. to is a control block diagram illustrating an embodiment of a vehicle capable of managing an address book using speech recognition.

FIG. 9 is a view illustrating another embodiment of an address book management system using speech recognition, and FIG. to is a control block diagram illustrating an embodiment of a vehicle capable of managing an address book using speech recognition.

Referring to FIG. 9, an address book management system 20 may include a first terminal device 100, a second terminal device 200 connected to the first terminal device 100 to communicate with the first terminal device 100 and a vehicle 300 connected to the first terminal device 100 to communicate with the first terminal device 100. As needed, the address book management system 20 may further include a communication service provider server 500 configured to mediate the communication between the first terminal device 100 and the second terminal device 200 to provide a communication service.

In this case, any one of the first terminal device 100 and the vehicle 300 may be operated as an address book management apparatus. In other words, the first terminal device 100 or the vehicle 300 may be an address book management apparatus, or alternatively, both of the first terminal device 100 and the vehicle 300 may be an address book management apparatus.

Figure 10:
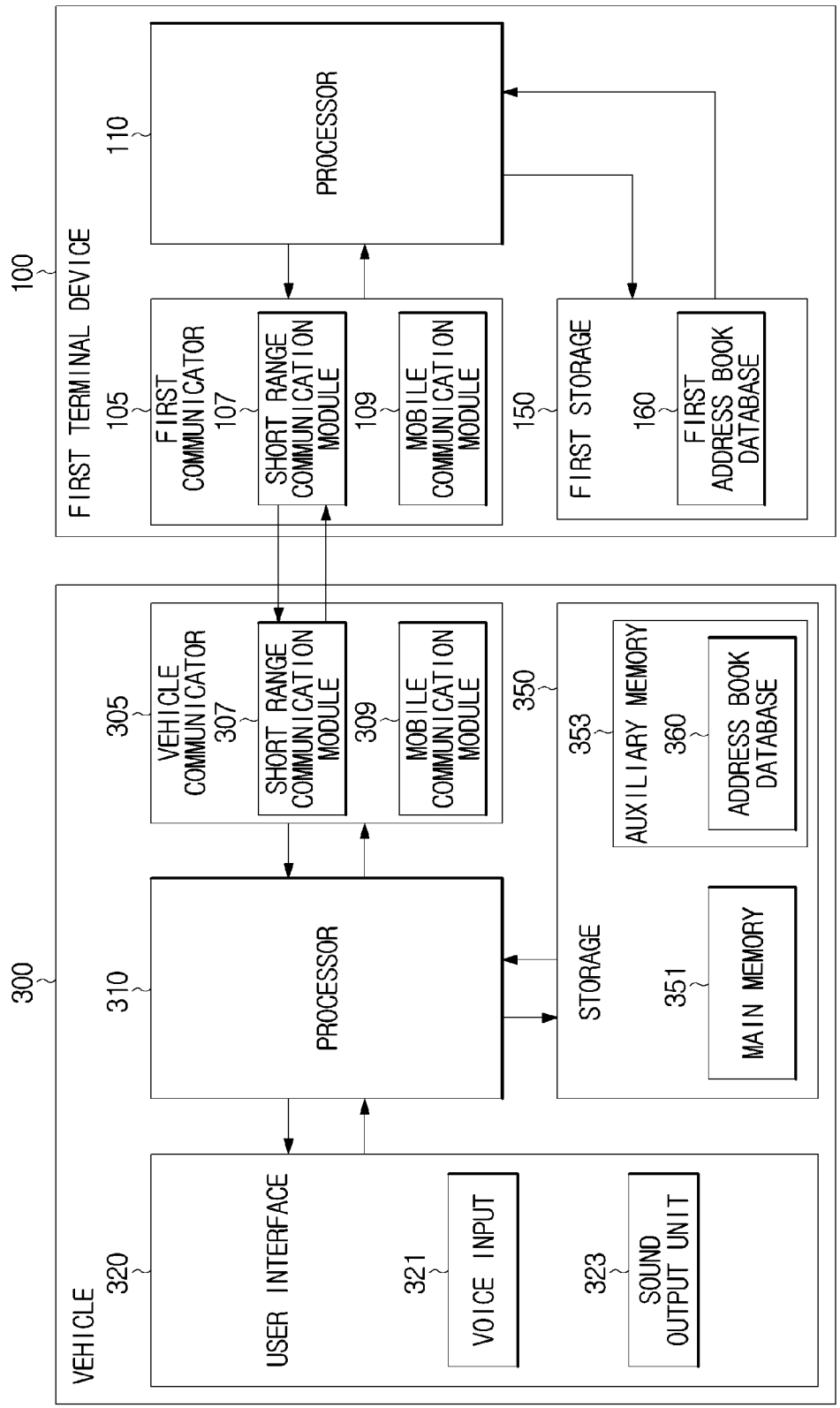

Referring to FIG. 10, the first terminal device 100 may include a communicator 105, a processor 110, and a first storage 150.

The first communicator 105 may include a short range communication module 107 and a mobile communication module 109 so that the first terminal device 100 is communicated with an external device.

The mobile communication module 109 may be configured to allow the first terminal device 100 to communicate with at least one of the second terminal device 200 or the communication service provider server 500 based on the mobile communication technology. Accordingly, the first terminal device 100 may receive a speech signal of the second user (u2) or transmit a speech signal of the first user (u1) through a certain communication network.

The short range communication module 107 may be configured to communicate with an external device, i.e., a short range communication module 307 of the vehicle 300, based on the short range communication technology.

The first terminal device 100 may transmit the speech signal of the second user (u2), which is transmitted from the second terminal device 200, to a communicator 305 of the vehicle 300 through the short range communication module 107. The first terminal device 100 may receive speech of the first user (u1), which is input via an input 321 of the vehicle 300, from the vehicle communicator 305.

In addition, the first terminal device 100 may transmit a part of all of the first address book database 160 to the vehicle communicator 305 of the vehicle 300 through the short range communication module 107 or the first terminal device 100 may receive a part of all of a vehicle address book database 360 stored in a storage 350 of the vehicle 300, from the vehicle communicator 305. At least one of the transmission of the first address book database 160 and the vehicle address book database 360 may be periodically performed, or may be performed according to user's selection. In addition, at least one of the transmission of the first address book database 160 and the vehicle address book database 360 may be performed in response to the update of at least one of the first address book database 160 and the vehicle address book database 360. Accordingly, the first address book database 160 of the first terminal device 100 and the vehicle address book database 360 of the vehicle 300 may be synchronized.

The processor 110 may perform a variety of processes related to the first terminal device 100. The processor 110 may generate a variety of control signals and transmit the control signal to each component of the first terminal device 100. When the processor 110 is the address book management apparatus, the processor 110 may be configured to perform at least one of the speech recognition (112), the natural language understanding (114), the verification process (119), and the update of the first address book database 160.

The first storage 150 may store various information related to the operation of the first terminal device 100, e.g., the first address book database 160.

Referring to FIG. to, the vehicle 300 may include the vehicle communicator 305, a processor 310, a user interface 320 and storage 360.

The vehicle communicator 305 may include a short range communication module 307 configured to communicate with an external device, i.e., the short range communication module 107 provided in the first terminal device 100, based on the short range communication technology.

The short range communication module 307 may perform the communication with the short range communication module 107 of the first communicator 105 using a predefined communication standard, e.g., Bluetooth.

The short range communication module 307 may receive the second speech signal caused by the utterance of the second user (u2), from the short range communication module 107 of the first terminal device 100, or transmit the first speech signal, which is input via the voice input 321 and caused by the utterance of the first user (u1), to the short range communication module 107 of the first terminal device 100.

In addition, the short range communication module 307 may transmit a part of all of the vehicle address book database 360 to the short range communication module 107 of the first terminal device 100 or the short range communication module 307 may receive a part of all of the first address book database 160 from the short range communication module 107 of the first terminal device 100.

According to embodiments, the vehicle communicator 305 may include a mobile communication module 309 configured to communicate with an external device, e.g., at least one of the first terminal device 100, the second terminal device 200, and the communication service provider server 500, based on the mobile communication technology. According to embodiments, the vehicle 300 may transmit and receive the speech signal or the address book database 160 and 360 through the mobile communication module 309.

The processor 310 may be configured to control the overall operation of the vehicle 300. The processor 310 may be implemented using central processing unit (CPU) or electronic control unit (ECU).

According to embodiments, the processor 310 may update the vehicle address book database 360 based on at least one of the speech signal of the first user (u1) and the speech signal of the second user (u2). The speech signal of the first user (u1) may be transmitted from the voice input 321 of the user interface 320 to the processor 310, and the speech signal of the second user (u2) may be transmitted from at least one of the short range communication module 307 or the mobile communication module 309 to the processor 310.

Particularly, the processor 310 may obtain a second keyword through the speech recognition (112), the natural language understanding (114), and the verification process (119), and update the vehicle address book database 360 using the obtained second keyword. The processor 310 may perform the speech recognition and obtain a first keyword from the result of the speech recognition (115). The processor 310 may obtain the second keyword based on the obtained first keyword (116) and an expected value (117). The processor 310 may perform the verification process using the obtained expected value.

According to embodiments, part of the speech recognition (112), the natural language understanding (114), the verification process (119), and the update of the vehicle address book database 360 may be performed by the processor 310 of the vehicle 300 and another part of the speech recognition (112), the natural language understanding (114), the verifi-cation process (119), and the update of the vehicle address book database 360 may be performed by the processor 110 of the first terminal device 100.

The speech recognition (112), the natural language understanding (114), the verification process (119), and the update of the vehicle address book database 360, which is performed by the processor 310, may be performed by the same method as the method illustrated in FIGS. 2 and 3A or by a modified method of the method illustrated in FIGS. 2 and 3A. The method has been described in detail and thus a detail description thereof will be omitted.

The user interface 320 may receive various commands or a variety of information from the first user (u1).

The user interface 320 may include the voice input 321 receiving the speech uttered by the first user (u1), outputting a speech signal corresponding the received speech, and transmitting the speech signal to the processor 310, and a sound output unit 323 outputting the speech signal transmitted from the processor 310, e.g., the speech signal of the second user (u2), to the outside to provide the speech signal to the first user (u1). The voice input 321 may be implemented using a microphone, and the sound output unit 323 may be implemented using a speaker, an earphone or a headset.

The storage 350 may include a main memory 351 and an auxiliary memory 353. According to embodiments, when an expected value is in a range of from a first reference value to a second reference value, the main memory 351 may temporarily store the second keyword. The auxiliary memory 353 may store the vehicle address book database 360. The vehicle address book database 360 may be manually or automatically synchronized with the first address book database 160 of the first terminal device 100.

An embodiment in which the first terminal device, the second terminal device and the vehicle are operated as the address book management apparatus has been described, but is not limited thereto. An additional server, which is connected to at least one of the first terminal device, the second terminal device and the vehicle, may perform various operations related to the management of the address book, e. g, at least one of the speech recognition (112), the natural language understanding (114), the verification process (119), and the update of the vehicle address book database 360.

Hereinafter an address book management method using the speech recognition will be described.

Figure 11:
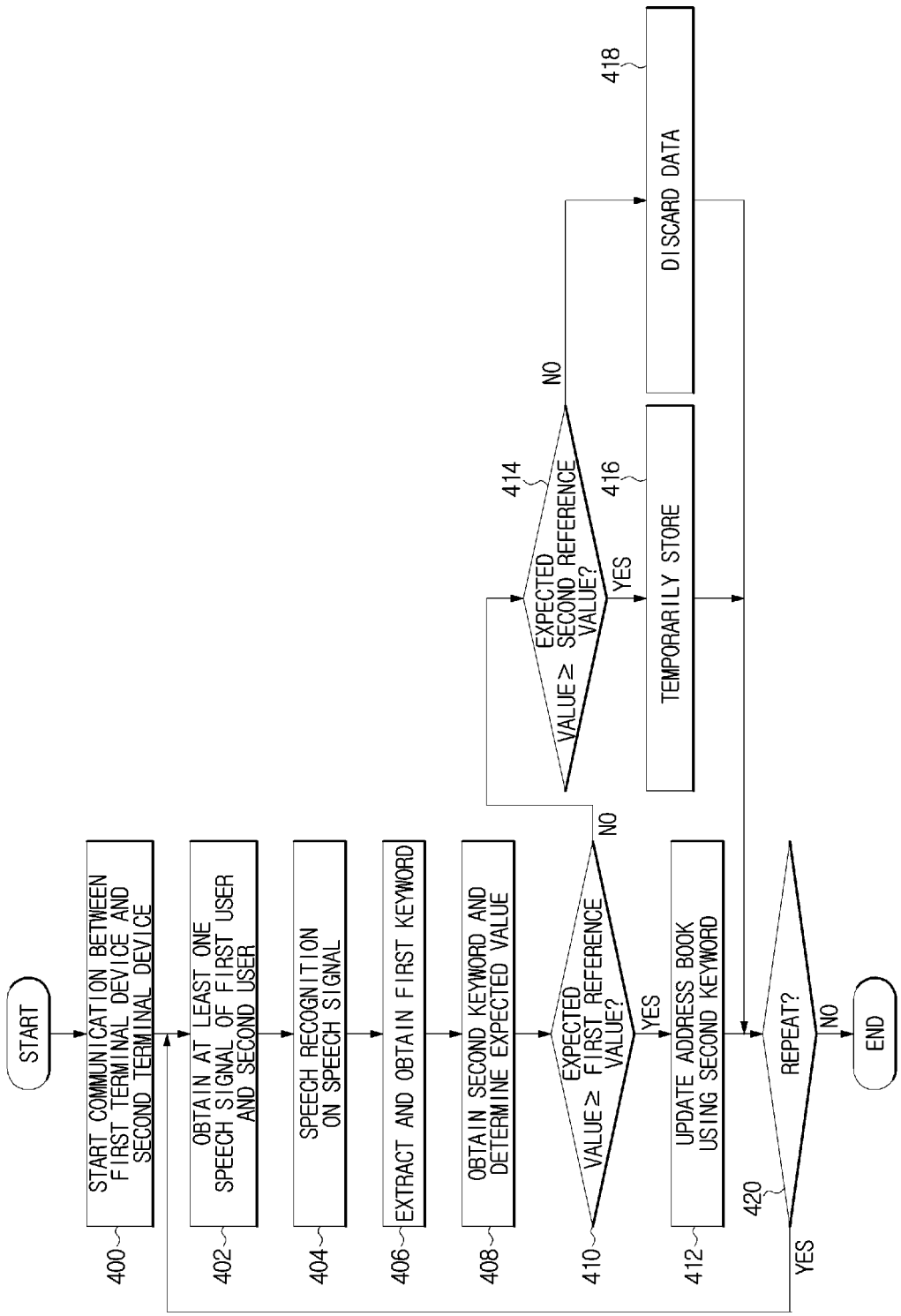
FIG. 11 is a flow chart illustrating an embodiment of address book management method using the speech recognition.

FIG. 11 is a flow chart illustrating an embodiment of address book management method using the speech recognition.

Referring to FIG. 11, the first terminal device used by the first user and the second terminal device used by the second user may be connected to communicate with each other (400). An address book database may be stored in at least one of the first terminal device and the second terminal device. The first terminal device and the second terminal device may be directly connected or indirectly connected via a communication service provider server.

When the first terminal device and the second terminal device are connected to communicate with each other, identification information about the second terminal device and a user of the second terminal device, e.g., at least one piece of identification information about the second user (u2) may be obtained. The obtainment may be performed by at least one of the first terminal device and the second terminal device. Alternatively, the obtainment may be performed a vehicle paired with the first terminal device thorough a wireless communication, e.g., Bluetooth.

The identification information about the second terminal device may be obtained by operating the first terminal device by the first user, e.g. inputting numbers, or by receiving a caller identification transmitted from the second terminal device.

In response to the communication between the first terminal device and the second terminal device, at least one of the first speech signal corresponding to the first user and the second speech signal corresponding to the second user may be obtained by at least one of the first terminal device, the second terminal device, the server and the vehicle (402).

When at least one of the first speech signal and the second speech signal is obtained, the speech recognition on the at least one of the first speech signal and the second speech signal may be performed (404). As a result of the speech recognition, an utterance, which corresponds to least one of the first speech signal and the second speech signal, in the text type may be obtained.

The speech recognition may be performed on only the first speech signal corresponding to a predetermined speech section and or on the second speech signal corresponding to a predetermined speech section. The predetermined speech section may include a certain period from when at least one of the first user and the second user initially utters. This speech recognition may be performed through the feature extraction, the application of acoustic model and the application of the language model.

As a result of the speech recognition, a first keyword may be extracted obtained from the first speech signal and the second signal (406). The first keyword may include a word, a phase, a sentence or other extractable phrases related to the update of the first address book database 160 among a word, a phase, a sentence or other extractable phrases which is directly extracted from the content of the utterance.

The first keyword may be obtained by performing the morphological analysis on at least one of an utterance corresponding to the first speech signal and in the text type and an utterance corresponding to the second speech signal and in the text type.

When the first keyword is acquired, a second keyword corresponding to the first keyword may be determined. According to embodiments, an expected value corresponding to the first and second keyword may be further determined (408).

According to embodiments, the second keyword may be variously determined. For example, the second keyword may be determined to be the same as the first keyword, or determined by adding a predetermined symbols or character to the first keyword. In addition, the second keyword may be determined by using a part of the first keyword.

The second keyword may be determined based on the relationship between the first user and the second user. For example, the relationship information may be pre-determined by having an appellation, and a relationship corresponding to the appellation. At least one of the first terminal device, the second terminal device, the server and the vehicle may detect a relationship corresponding to the first keyword, e.g., appellation, obtained from the relationship information, and define the detected relationship as the second keyword, thereby determining the second keyword.

The obtainment of the first keyword and/or the obtainment of the second keyword may be performed by using the learning algorithm. The learning algorithm may be based on at least one of Deep Neural Network (DNN), Convolutional Neural Network (CNN), Recurrent Neural Network (RNN), Deep Belief Network, (DBN), and Deep Q-Networks.

The expected value may be obtained by using a probability output value, which is calculated during the performance of the learning algorithm based on the Deep Neural Network (DNN). For example, a probability output value, which is acquired by the calculation of activation function, may be used as the expected value.

In addition to the probability value, as mentioned above, the expected value may be implemented using various functions considered by the designer.

The expected value calculated as mentioned above may be compared with at least one of the first reference value and the second reference value. In this case, the expected value may be successively compared with the first reference value and the second reference value that is relatively smaller than the first reference value.

For example, the expected value may be firstly compared with the first reference value (410).

When the calculated expected value is larger than the first reference value (YES in 410), it may be determined that the second keyword is appropriate and the second keyword may be added to the address book database, thereby updating the address book database (412). In this case, the second keyword may be recorded on a field corresponding to the second keyword among a plurality of fields provided in any one address book record. Any one address book record may correspond to the second terminal device.

When the calculated expected value is less than the first reference value (NO in 410), the calculated expected value may be compared with the second reference value (414).

When the calculated expected value is larger than the second reference value (YES in 414), i.e., the expected value is in a range of from the first reference value to the second reference value, the second keyword may be temporarily stored in the main memory or the auxiliary memory (416).

When the calculated expected value is less than the second reference value (NO in 414), various data, which includes the second keyword and is acquired by the calculation, may be discarded (418)

The above mentioned steps (400 to 418) may be repeatedly performed more than once, according to the designer's selection or the user's selection (420). In this case, the above mentioned steps (400 to 418) may be maintained during the first user and the second user are communicated with each other.

The above mentioned address book management method may be applied to the control method of the vehicle without changes or with modification.

As is apparent from the above description, according to the proposed address book management apparatus using speech recognition, a vehicle, an address book management system, and an address book management method using speech recognition, it may be possible to quickly and conveniently modify and update an address book based on a spoken dialogue without the direct operation of the user.

As is apparent from the above description, according to the proposed address book management apparatus using speech recognition, a vehicle, an address book management system, and an address book management method using speech recognition, it may be possible to automatically add and store a name, a nickname, an appellation, a relationship or a contact of the other party to an address book, thereby improving user convenience.

As is apparent from the above description, according to the proposed address book management apparatus using speech recognition, a vehicle, an address book management system, and an address book management method using speech recognition, it may be possible to improve the safety of the drive since it is allowed a driver to pay less attention for updating the address book.

As is apparent from the above description, according to the proposed address book management apparatus using speech recognition, a vehicle, an address book management system, and an address book management method using speech recognition, it may be possible to properly and sufficiently secure personal data related to the driver of the vehicle so that the vehicle can provide various services optimized for individuals.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method for managing an address book using speech recognition, the method comprising:
   connecting a first terminal device that stores a first address book database with a plurality of fields to a second terminal device that stores a second address book database so that the first terminal device and the second terminal device communicate with each other;
   obtaining a speech signal of at least one of a first user of the first terminal device and a second user of the second terminal device;
   performing speech recognition on the speech signal of the at least one of the first user and the second user;
   obtaining a first keyword from the speech signal of the at least one of the first user and the second user, the first keyword obtained based on a result of the speech recognition using a learning algorithm, wherein the first keyword indicates a relationship between a speaking user and a listening user being addressed by the speaking user and wherein the speaking user and the listening user are one or other of the first user and the second user;
   determining a second keyword corresponding to the first keyword, wherein the second keyword is the same as or different than the first keyword, wherein the second keyword is a value for an object specific to the first address book database, wherein the object is a data field with values for expressing a relationship of the second user to the first user, and wherein the second keyword is either predefined or obtained from a learning process in the first address book database; and
   updating the first address book database by adding the second keyword to the object corresponding to the first address book database with a selected field of the plurality of fields, wherein the first address book database includes the address book.

2. The method of claim 1, wherein the second keyword corresponding to the first keyword comprises information related to a relationship between the speaking user and the listening user.

3. The method of claim 1, further comprising obtaining identification information related to the second terminal device or the second user.

4. The method of claim 1, wherein updating the first address book database using the first keyword further comprises calculating an expected value about the second keyword.

5. The method of claim 4, wherein updating the first address book database using the first keyword further comprises:

updating the first address book database using the second keyword when the expected value is greater than a first reference value;
temporarily storing the second keyword when the expected value is less than the first reference value but is greater than a second reference value that is smaller than the first reference value; and
discarding the second keyword when the expected value is less than the second reference value.

6. The method of claim 4, wherein the expected value comprises a probability output value obtained by using the learning algorithm.

7. The method of claim 1, wherein the plurality of fields comprises a name field, an organization field, a title field and a contact information field, and wherein the selected field comprises the organization field or the title field.

8. The method of claim 1, wherein the learning algorithm comprises Deep Neural Network (DNN), Convolutional Neural Network (CNN), Recurrent Neural Network (RNN), Deep BeliefNetwork, (DBN), or Deep QNetworks.

9. An apparatus comprising:
   an address book database with a plurality of fields;
   a speech signal input unit configured to receive an input of a first speech signal of a first user;
   a communicator configured to receive a second speech signal of a second user transmitted from a terminal device of the second user;
   a processor configured to perform speech recognition about at least one speech signal of the first speech signal and the second speech signal, to obtain a first keyword from the at least one speech signal based on a result of the speech recognition, to determine a second keyword corresponding to the first keyword, and to update the address book database by adding the second keyword to an object corresponding to the address book database with a selected field of the plurality of fields;
   wherein the processor is configured to obtain the first keyword by analyzing an utterance obtained according to the result of the speech recognition by using a learning algorithm;
   wherein the first keyword indicates a relationship between a speaking user and a listening user being addressed by the speaking user;
   wherein the speaking user and the listening user are one or the other of the first user and the second user;
   wherein the second keyword is the same as or different than the first keyword;
   wherein the second keyword is a value for the object specific to the first address book database;
   wherein the object is a data field with values for expressing a relationship of the second user to the first user; and
   wherein the second keyword is either pre-defined or obtained from a learning process in the address book database.

10. The apparatus of claim 9, wherein the second keyword corresponding to the first keyword comprises information related to a relationship between the speaking user and the listening user.

11. The apparatus of claim 9, wherein the processor is configured to obtain identification information related to the second user or the terminal device of the second user.

12. The apparatus of claim 9, wherein the processor is configured to calculate an expected value about the first keyword.

13. The apparatus of claim 12, wherein the processor is configured to update the address book database using the first keyword when the expected value is greater than a first reference value, to temporarily store the first keyword when the expected value is less than the first reference value but greater than a second reference value that is smaller than the first reference value, or to discard the first keyword when the expected value is less than the second reference value.

14. The apparatus of claim 12, wherein the expected value comprises a probability output value obtained by performance of the learning algorithm.

15. The apparatus of claim 9, wherein the plurality of fields comprises a name field, an organization field, a title field and a contact information field, and wherein the selected field comprises the organization field or the title field.

16. The apparatus of claim 9, wherein the learning algorithm comprises Deep Neural Network (DNN), Convolutional Neural Network (CNN), Recurrent Neural Network (RNN), Deep BeliefNetwork, (DBN), or Deep QNetworks.

17. A vehicle comprising:
a speech signal input interface configured to receive an input of a first speech signal of a first user;
a communicator configured to be to a first terminal device to communicate with the first terminal device, and configured to transmit the first speech signal of the first user to the first terminal device or configured to receive a second speech signal of a second user transmitted from the first terminal device;
a vehicle address book database configured to be synchronized with an address book database with a plurality of fields stored in the first terminal device; and
a processor configured to perform speech recognition about at least one speech signal of the first speech signal and the second speech signal, to obtain a first keyword from the at least one speech signal based on a result of the speech recognition, to determine a second keyword corresponding to the first keyword, and to update the address book database by adding the second keyword to an object corresponding to the address book database with a selected field of the plurality of fields;
wherein the processor is configured to obtain the first keyword by analyzing an utterance obtained according to the result of the speech recognition by using a learning algorithm;
wherein the first keyword indicates a relationship between a speaking user and a listening user being addressed by the speaking user;
wherein the speaking user and the listening user are one or the other of the first user and the second user;
wherein the second keyword is the same as or different than the first keyword;
wherein the second keyword is a value for the object specific to the first address book database;
wherein the object is a data field with values for expressing a relationship of the second user to the first user; and
wherein the second keyword is either pre-defined or obtained from a learning process in the address book database.

18. The vehicle of claim 17, wherein the second keyword comprises information related to a relationship between the speaking user and the listening user.

19. The vehicle of claim 17, wherein the processor is configured to calculate an expected value about the first keyword, to update the address book database with respect to the expected value, to temporarily store the first keyword, or to discard the first keyword.

20. The vehicle of claim 17, wherein the plurality of fields comprises a name field, an organization field, a title field and a contact information field, and wherein the selected field comprises the organization field or the title field.

* * * * *